Jan. 10, 1939.  A. P. BALL  2,143,136
APPARATUS FOR MAKING VEHICLE BODY PANELS
Original Filed Oct. 6, 1932   2 Sheets-Sheet 1
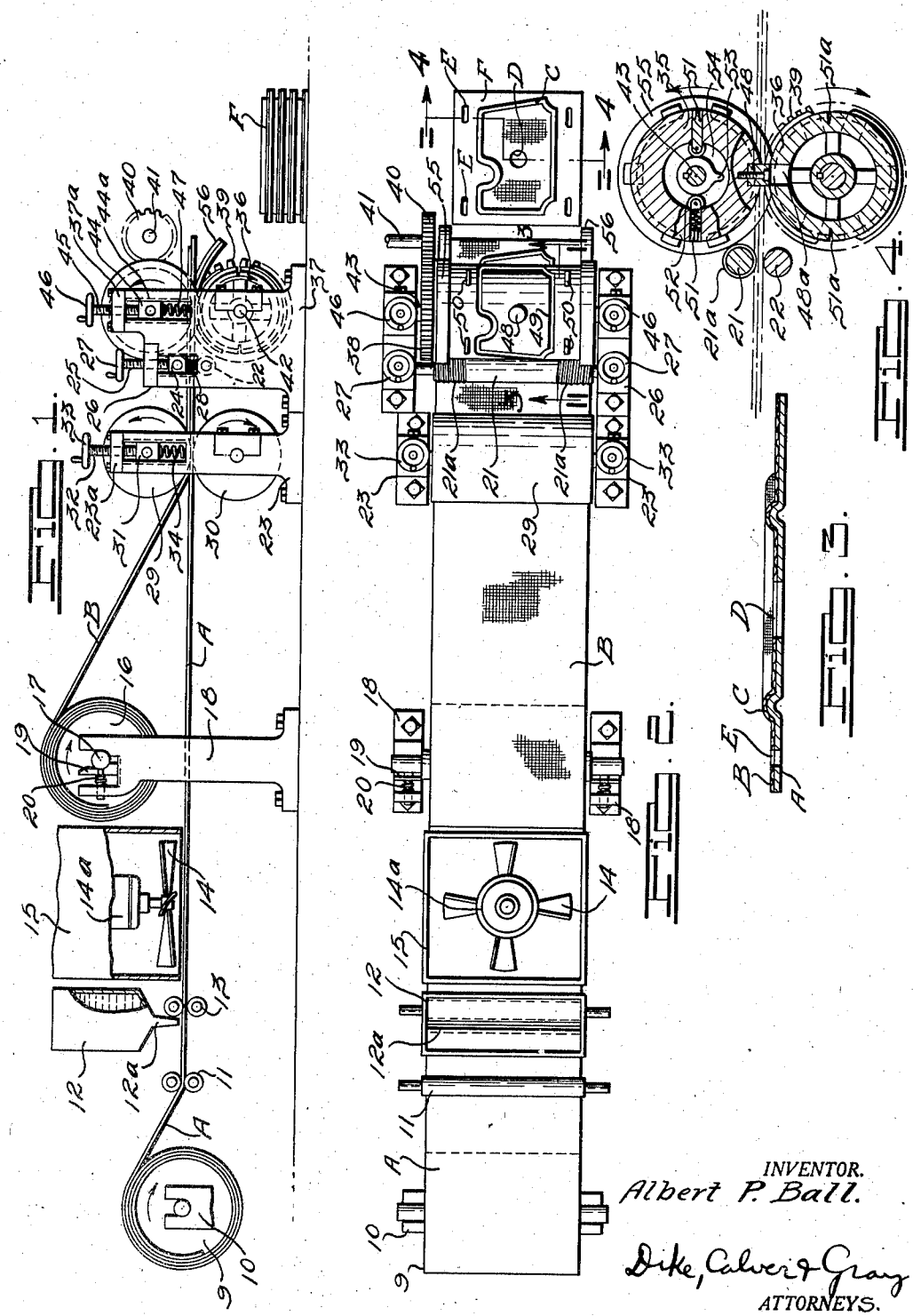
INVENTOR.
Albert P. Ball.
Dike, Calvert & Gray
ATTORNEYS.

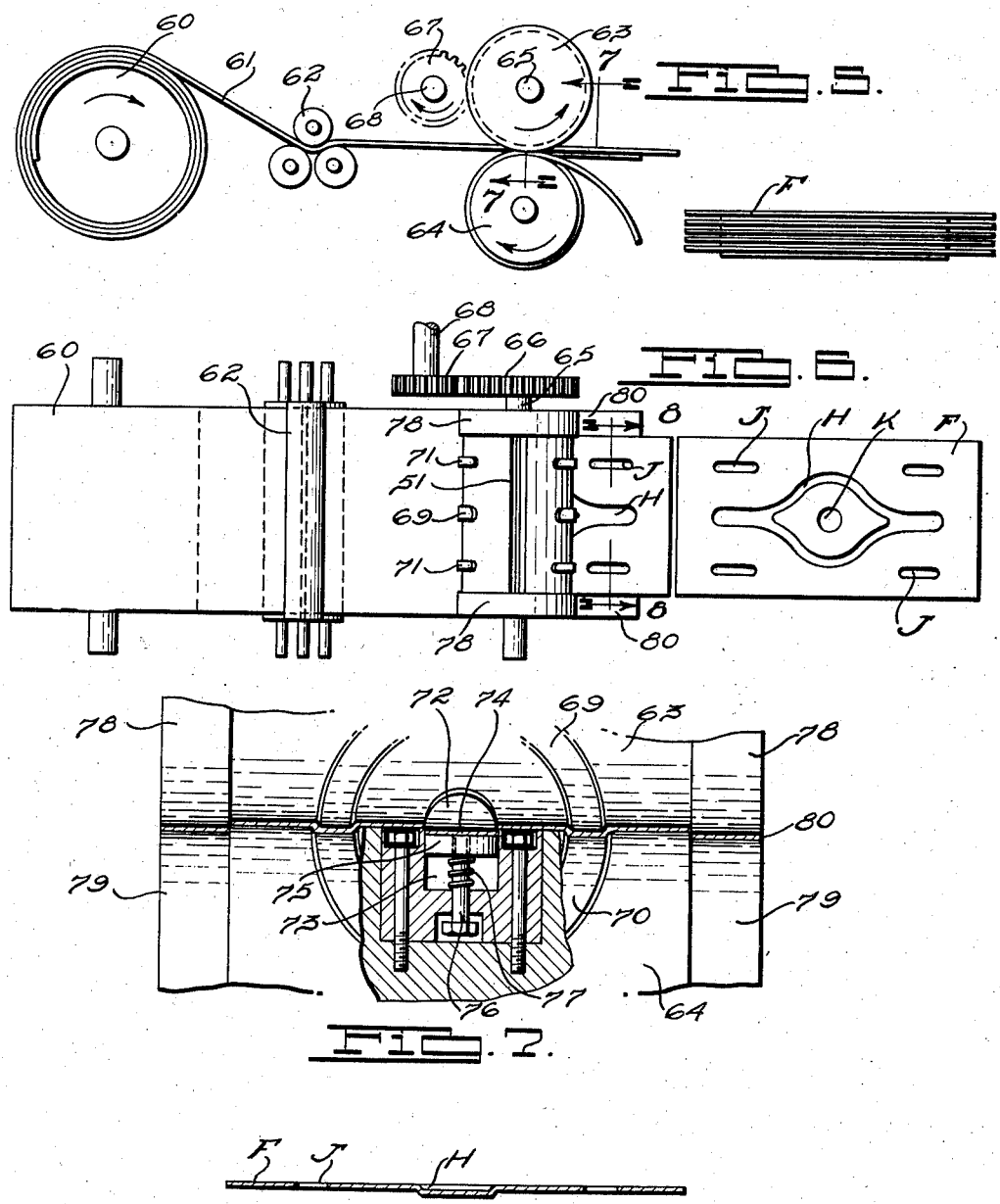

Patented Jan. 10, 1939

2,143,136

UNITED STATES PATENT OFFICE 2,143,136

APPARATUS FOR MAKING VEHICLE BODY PANELS

Albert P. Ball, Detroit, Mich., assignor to Briggs Manufacturing Company, Detroit, Mich., a corporation of Michigan Original application October 6, 1932, Serial No. 636,544. Divided and this application October 23, 1935, Serial No. 46,310. Renewed May 31, 1938

5 Claims. (Cl. 154—1)

This invention relates to an apparatus for producing panels for automobile bodies, such panels being formed from relatively flexible sheet material and in their completed form usually containing patterns or designs which may be in the nature of embossed or pressed portions, or may be openings or cut out portions punched or pierced from the material. The invention is particularly advantageous in the production of trim panels which are ordinarily of composite formation and usually comprise backing strips of relatively stiff but flexible material, such as fiber or cardboard, and facing strips of cloth fabric which form the exposed interior trim of the automobile body.

An object of the invention is to provide an apparatus for producing these panels in a continuous manner whereby substantial savings in direct labor costs, equipment, and other manufacturing costs are obtained and whereby the time required to perform the various operations on the panel blanks is materially reduced.

A further object of the invention is to provide an apparatus for making trim panels for automobile bodies in which a foundation or backing strip and a fabric strip are cemented together and pattern portions are formed in the composite strip by rollers, and in which the edges of the combined strips may be trimmed and panels cut from the strip substantially at the same time while the strip travels continuously through the machine.

A further object of the invention is to provide an apparatus for producing panels of laminated or composite formation in which a plurality of separate strips of material are cemented together or otherwise permanently united, in which pattern or design portions are pressed into the composite strip and in which the strip is trimmed and cut into a succession of similar panels during the continuous travel of the strip through the machine.

Other objects of this invention will appear in the following description and appended claims, reference being had to the accompanying drawings forming a part of this specification wherein like reference characters designate corresponding parts in the several views.

Fig. 1 is a side elevation, partly in section and partly diagrammatic, illustrating one form of apparatus for carrying out the present invention.

Fig. 2 is a plan view of the structure shown in Fig. 1.

Fig. 3 is a vertical section taken through line 3—3 of Fig. 2 in the direction of the arrows.

Fig. 4 is a section taken through line 4—4 of Fig. 2 in the direction of the arrows.

Fig. 5 is a diagrammatic side elevation illustrating another form of apparatus for carrying out the invention.

Fig. 6 is a plan view of the construction shown in Fig. 5.

Fig. 7 is a view, partly in section, taken through line 7—7 of Fig. 5.

Fig. 8 is a section taken through line 8—8 of Fig. 6.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The embodiment of the invention illustrated in Figs. 1 to 4 inclusive is particularly adapted for the purpose of producing in a continuous manner composite trim panels for automobile bodies, which panels in this instance are of two-ply laminated structure comprising a foundation or backing strip of relatively stiff but flexible material and a facing strip of cloth or trim fabric. The invention, however, is not limited to the production of two-ply composite trim panels as it may be equally adapted for the production of panels consisting of three or more plies. Usually the trim panel is composed of a base or backing material, such as cardboard or ply-board, but as a result of the present invention I may employ a strip of fine wire mesh as a backing for the cloth or fabric, and when using wire mesh I prefer to apply a backing or bottom covering strip to the wire mesh which may be a strip of paper.

In Figs. 2 and 4 there is illustrated, by way of example, one form of trim panel F which may be produced in the apparatus. In this instance the panel comprises a foundation or backing portion A to which is cemented a top fabric portion B. The composite panel is pressed to provide a suitable pattern such as the embossed portion C and pierced openings D and E.

Referring to the apparatus, the backing strip A is carried in coiled form on a supply roll 9 supported for rotation on suitable uprights 10.

The strip A passes between a pair of guide and straightening rollers 11 underneath the nozzle 12a of a tank or container 12 which may contain, as in the present instance, a supply of liquid cement. The mouth of the nozzle 12a is flattened to provide a narrow transverse orifice projecting the full width of the strip A so as to coat the entire surface with cement during the travel of the strip. Thence, the strip passes between a pair of spreader rollers 13 for spreading the cement on the strip in an even and uniform manner. The strip is then fed beneath a fan 14 located within an open mouth casing 15. This fan is driven by a suitable motor 14a and operates to direct an air stream against the cemented face of the strip and partially dry the cement so that it will have the proper tacky consistency. Other suitable drying means may be utilized in place of the fan if desired.

The facing strip B is wound and carried on a supply roller 16, the pivots 17 of which are supported in bearings at the upper ends of a pair of pedestals 18. Resistance is provided to the pull-off of the strip from the roll by means of friction blocks 19 engaging the pivots 17 under the pressure of springs 20.

The superimposed strips are guided into superimposed relation and caused to pass between a pair of presser rollers 29 and 30 which function to press the strips together and effect a permanent bond by virtue of the cement or adhesive material between the strips. The lower presser roller 30 is preferably journaled in fixed bearings in a pair of laterally spaced uprights 23. The upper presser roller 29 is preferably journaled in a pair of slide blocks 31 which are adjustable in vertical ways in the uprights 23 and are carried by a pair of screw shafts 32 threaded through tapped holes in the cross heads 23a. The shafts are rotated to adjust the presser roller 29 by means of hand wheels 33. The blocks 31 are adjustable against the action of compression springs 34 and by virtue of the adjusting means for the roller 29 it will be seen that the presser rollers may be properly positioned to accommodate any thickness of the laminated strip.

The united strips A and B are guided from the presser rolls 29 and 30 between a pair of stretcher rollers 21 and 22. The lower roller 22 rotates in fixed bearings in a pair of spaced uprights 37. The upper roller 21 is journaled in a pair of slide blocks 24 which slide in vertical ways, as shown, in the uprights 37. The slide blocks 24 are carried at the lower ends of a pair of screw threaded shafts 25 which extend through tapped holes in the cross heads 26 and are operated by means of hand wheels 27. The slide blocks 24 preferably work against compression springs 28 interposed between the blocks and the bottoms of the guideways. The upper stretcher roller 21 is provided at opposite ends with reverse spiral threads 21a by means of which the side edges of the fabric B are pulled laterally so as to stretch the fabric and render it smooth and unwrinkled before the strips are fed between the forming rollers. Since the roller 21 may be adjusted vertically it will be seen that the bite of the stretcher roller on the fabric may be properly regulated.

From the stretcher rollers the laminated strip is then guided between a pair of forming rollers 35 and 36 carried by uprights 37 and which, in the present instance, are power driven and function as means for feeding the strips A and B through the machine. Attached to the roller 35 is a ring gear 38 which meshes with a gear 39 carried by the lower roller 36. The gear 38 is driven by a gear 40 from a shaft 41 which may be operated through suitable reduction gearing from an electric motor. The stub shafts 42 of the lower roller 36 are journaled in bearings in the uprights 37. The upper roller 35 is free to rotate on a non-rotatable cross shaft 43 the opposite ends of which are secured in guide blocks 44 slidable in vertical ways 44a in the uprights 37. These guide blocks are carried by screw shafts 45 operable by means of hand wheels 46. The adjusting shafts 45 cooperate with the threads of tapped holes in the cross heads 37a. The slide blocks 44 are adjustable against compression springs 47 located at the bottom of the ways 44a. By virtue of the above described adjusting means the proper relative positions of the pattern forming rollers may be determined.

In the present instance the forming rollers are provided with duplicate patterns so that at each complete revolution the rollers will repeat the same pattern twice in the length of the laminated strip. Obviously the rollers may be of a size to produce a lesser or greater number of duplicate patterns, each complete pattern ordinarily being used for a single panel F. In the present instance the upper roller 35 is provided with projecting portions 50 mating with correspondingly shaped recesses in the face of the lower roller 36 for piercing the laminated strip so as to produce the openings E in the panel. The upper roller also has opposed projecting portions 48 mating with correspondingly shaped recesses in the lower roller for piercing the strip to form the openings D. The pattern rollers in this instance also are provided with grooves or channel portions 49 on the upper roller mating with correspondingly shaped projections or ribs on the lower roller by means of which the embossed portion C is pressed into the laminated sheet, as shown in Fig. 4.

The pattern forming rollers are also provided with means for shearing the strip transversely into the successive panels F. To this end the upper roller 35 may be provided with diametrically opposed knives 51 and the lower roller with recesses 51a into which the knives are shifted to shear the strip. Each knife 51 is in the form of a plunger slidable in a slot in the roller 35 and carrying at its inner end a cam roller 52 adapted to contact with a cam 53 secured to the shaft 43. The cam roller and cam are located within a recess 54 in the hub of the roller 35. Hence, during the rotation of the roller 35 cam rollers 52 will successively travel into position to contact with cam 53 whereupon the knives 51 will be successively shifted outwardly from the face of the roller to shear the strip during its travel. In the present instance two panels F will be cut from the strip by the knives 51 at each revolution of the forming rollers 35 and 36. These rollers are also provided at each side with cooperating cutting means for trimming the longitudinal edges of the strip. In the present instance the trimming means comprises an annular projecting portion 55 at each end of the upper roller 35 which travels in a groove in the lower roller and operates to trim off the portions 56 at the longitudinal edges of the strip.

Where the pattern formed in the blank includes openings pierced or punched in the strip, the slugs may be ejected in any suitable manner. In the foregoing embodiment the lower roller 36 may be hollow, as shown, and the slugs punched from the strip pass directly into the interior of the roller. These may be discharged by directing an air blast through the roller.

It will be understood that where the laminated strip consists of more than two plies, an additional supply roller or rollers and cementing means are provided as needed, all strips being joined together and fed continuously to the pattern forming rollers.

From the foregoing it will be seen that the pattern forming rollers 35 and 36 are, in the present preferred embodiment of the invention, provided with means for pressing an embossed design in the laminated strip, piercing openings therein, trimming the edges of the strip, and cutting off the strip transversely, all of which may be accomplished simultaneously during the continuous travel of the strip through the machine.

Referring to the embodiment illustrated in Figs. 5 to 8 inclusive, the apparatus in this instance is constructed, by way of example, to form a succession of panels F out of flexible material, such as sheet steel. Any suitable pattern may be produced, and in Fig. 6 there is illustrated a panel having an embossed portion H, openings J and an aperture K. The sheet metal strip is coiled and supported on a supply roll 60 from which it is fed through guide and straightening rollers 62. Thence the strip travels continuously between the pattern forming rollers 63 and 64. The shaft 65 of the upper roller 63 is driven through meshing gears 66 and 67 from a drive shaft 68 which in turn is driven from an electric motor or other power source.

The upper roller in this instance is provided with a projecting portion 69 working in a groove 70 in the lower roller and designed to press into the strip the embossed portion H. As in the previous embodiment the rollers are provided with duplicate pattern forming portions so as to repeat the pattern twice during each revolution of the rollers. The upper roller also has projections 71 adapted to coact with the edges of correspondingly shaped recesses in the lower roller to pierce the sheet and produce the openings J. The upper roller also is provided with diametrically opposed projecting portions 72 adapted to coact with the edges of recesses 73 in the lower roller to punch out the portions 74 to produce apertures K. For the purpose of removing the slugs 74 the punch portion 72 cooperates with a knockout plunger 75 located in the recess 73. The plunger 75 is carried by a sliding guide rod 76 and works against a spring 77. It will be understood that after the rollers have revolved past the point where the slug 74 is punched from the strip the plunger 75 will be shifted by the spring to eject the slug from the lower roller.

The pattern forming rollers are also provided with mechanism for trimming the edges of the strip. This mechanism comprises annular cutting projections 78 cooperating with the edges of grooves 79 in the lower roller to trim off the edge portions 80 of the strip continuously during its travel, as shown in Fig. 7.

From the foregoing it will be seen that the strip during its continuous travel through the machine may be simultaneously embossed, pierced and trimmed. At the same time the blanks F are cut off from the strip, two during each revolution of the rollers, by means of transverse knives 51 constructed and operating similar to the knives 51 above described in connection with the embodiment illustrated in Figs. 1 to 4 inclusive.

This application is a division of my co-pending application, Serial No. 636,544, filed October 6, 1932, now Patent No. 2,021,095, patented November 12, 1935.

I claim:

1. A machine for forming laminated panels, comprising means for guiding a backing strip and a fabric strip into superposed relation, means for uniting said strips together during the travel thereof continuously in a predetermined path longitudinally of the machine, and means for thereafter stretching the fabric strip transversely of the machine and uniformly across the backing strip.

2. A machine for forming laminated panels, comprising means for guiding a backing strip and a fabric strip into superposed relation, means for uniting said strips together during the travel thereof continuously in a predetermined path longitudinally of the machine, means for thereafter engaging the side edges of and stretching the fabric strip in a direction transverse to the direction of travel thereof uniformly across the backing strip, and means for embossing said laminated strip.

3. A machine for forming laminated panels comprising means for guiding a backing strip and a fabric strip into superimposed relation and for uniting said strips together to form a laminated strip, means for moving said strips continuously in a predetermined path longitudinally through the machine, and means acting on the side edges of said moving laminated strip for stretching the fabric strip outwardly in opposite directions transversely of the machine and uniformly across the backing strip.

4. A machine for forming laminated panels comprising means for guiding a backing strip and a fabric strip into superimposed relation and for uniting said strips together to form a laminated strip, means for moving said strips continuously in a predetermined path, means acting on the opposite side edges of said moving laminated strip for stretching the fabric strip uniformly across the backing strip, and a pair of superimposed rollers located beyond said stretching means for embossing said laminated strip.

5. A machine for forming laminated panels comprising means for guiding a backing strip and a fabric strip into superimposed relation and for uniting said strips together to form a laminated strip, means for moving said strips continuously in a predetermined path longitudinally through the machine, means acting on said moving laminated strip adjacent its side edges for stretching the fabric strip uniformly across the backing strip in opposite directions transverse to the path of movement of said strips, means beyond said stretching means for embossing said laminated strip to form a succession of repeated patterns, and means for shearing the strip into blanks each containing a pattern.

ALBERT P. BALL.

CERTIFICATE OF CORRECTION.

Patent No. 2,143,136.                                           January 10, 1939.

ALBERT P. BALL.

It is hereby certified that error appears in the printed specification of the above numbered patent requiring correction as follows: Page 3, second column, line 25, claim 2, for the word "of" read through; and that the said Letters Patent should be read with this correction therein that the same may conform to the record of the case in the Patent Office.

Signed and sealed this 21st day of March, A. D. 1939.

Henry Van Arsdale.

(Seal)                                                 Acting Commissioner of Patents.